Figure 1:
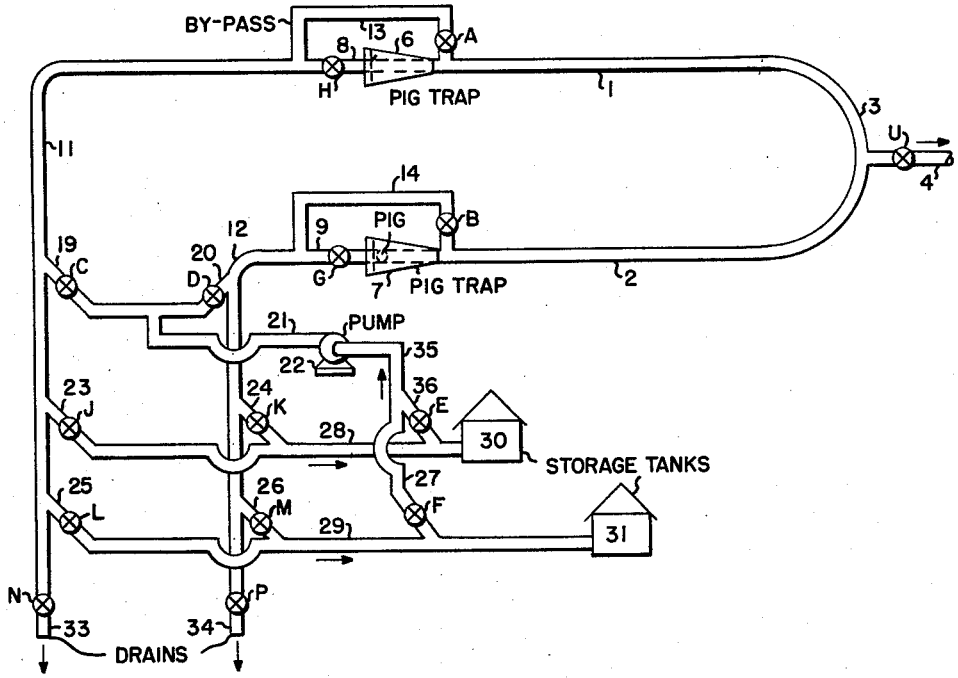

June 2, 1964  J. A. FOORD ETAL  3,135,278
LOADING PIPELINE PIGGING SYSTEM AND METHOD
Filed July 20, 1962

John A. Foord
Daniel Swinton   Inventors

By Henry Berk

Patent Attorney

United States Patent Office 3,135,278
Patented June 2, 1964

3,135,278
LOADING PIPELINE PIGGING SYSTEM
AND METHOD
John A. Foord, Chatham, and Daniel Swinton, Cranford, N.J., assignors to Esso Research and Engineering Company, a corporation of Delaware
Filed July 20, 1962, Ser. No. 211,353
5 Claims. (Cl. 137—15)

This invention relates to a pipeline system useful for transporting a multiplicity of fluid products consecutively from their supply sources to a remote loading or discharge line, the opening and closing of which determines the order of operations for filling the system with a certain product, discharging the products at a load position, and displacing of the products from the system back to their separate sources.

The pipeline system of the present invention is particularly useful for loading fixed volume carriers or containers, as in marine shipping of various petroleum products loaded into separate tanks in one ship. In this kind of loading, there is generally a requirement that the flow of any product into a fixed volume tank of the ship should be controlled at the loading line abroad ship, the ship being located at a pier or off-shore a long distance from the supply source or storage tanks on-shore. Without a system like that of the present invention, a large number of pipelines have to be used, each filled with a different product. With the use of a transport pipeline for each product and auxiliary equipment, the installation cost is high. The use of a large number of pipelines for transporting a long distance off-short makes an unwieldy problem of installation. There are also other disadvantages in having a large number of pipelines filled with a number of different products in certain locations.

The system of the present invention can be used to transport any number of fluid products, such as refined or light-colored oils and unrefined or dark-colored oils, or products of different densities through the same pipeline, which preferably makes a looped or U circuit. To form such a circuit, two long parallel lines, which are the main transport lines, are made to come together at a U bend or loop where the ship loading line is connected. At the other ends of these transport lines on-shore or near the supply tanks, these parallel lines terminate in a trap or holding zone for a solid displacement device known as a "pig."

The displacement device, commonly called a pig, serves as an interface separator between the products and for sweeping the products from the lines through which the pig travels. The pig can travel through the U bend or loop of the circuit and need not be removed from the system in passing one product after another through such a circuit. After one product is displaced from the circuit, both lines can be used for transporting another product or fluid. Preferably, the pig or displacement device has a spherical or spheroidal shape. It is essentially made of a rubbery material, such as polychloroprene, commercially known as neoprene. It may be a solid sphere or an inflatable sphere which can be filled with a liquid to inflate it and make it slightly larger in diameter than the inside diameter of the pipeline to be pigged. In pigging a pipeline, the pig is forced by gaseous or liquid fluid to travel through the pipeline. The outer surface of the pig presses against the inner surface of the pipeline with a squeegee action, forcing the fluid out ahead of it and functioning as an interface separator between the fluid being forced ahead of the pig and the fluid propelling the pig from its rear.

Another form of pig is in the shape of a piston with elastic rubbery cups that press against the inner wall of the pipeline, but this kind is not as well adapted for loop circuits as is the ball pig.

Starting with the U circuit, empty or loaded with, say, a light-colored liquid for transportation between parallel lines forming said circuit to the outlet in the U bend at the ship loading position, three principal steps of the procedure are:

(a) Streams of a light-colored liquid are supplied to flow through parallel lines in the U circuit to the open outlet at the U bend until the outlet valve is closed, which may be indicated at the supply pump by buildup of pressure.

(b) A dark-colored liquid is passed into the inlet of one of the parallel transport lines to push the pig acting as a separator between the light and dark-colored liquids around the U circuit so as to displace the light liquid from said circuit to its supply source as the pig travels to the trap from one end of the U circuit to the other end, thus at the same time filling the U circuit with the dark liquid.

(c) With the outlet valve opened in the loading line at the U bend, streams of dark liquid are supplied through both parallel transport lines of the U circuit to the outlet where loading into a receiving tank takes place until the tank is properly filled and the outlet valve is then closed.

The steps are repeated in supplying any number of different products with the use of the single U circuit and with the use of a single pump, if desired.

In the attached drawing are shown two schematic layouts of apparatus for the looped pipeline systems suitable for carrying out the steps outlined.

In FIGURE 1 is shown a U circuit in which the two parallel transport lines have at each of their supply inlet ends, a pig trap with an arrangement of piping to make the pig travel through the U circuit from one trap to the other during the displacement operation.

Figure 2:
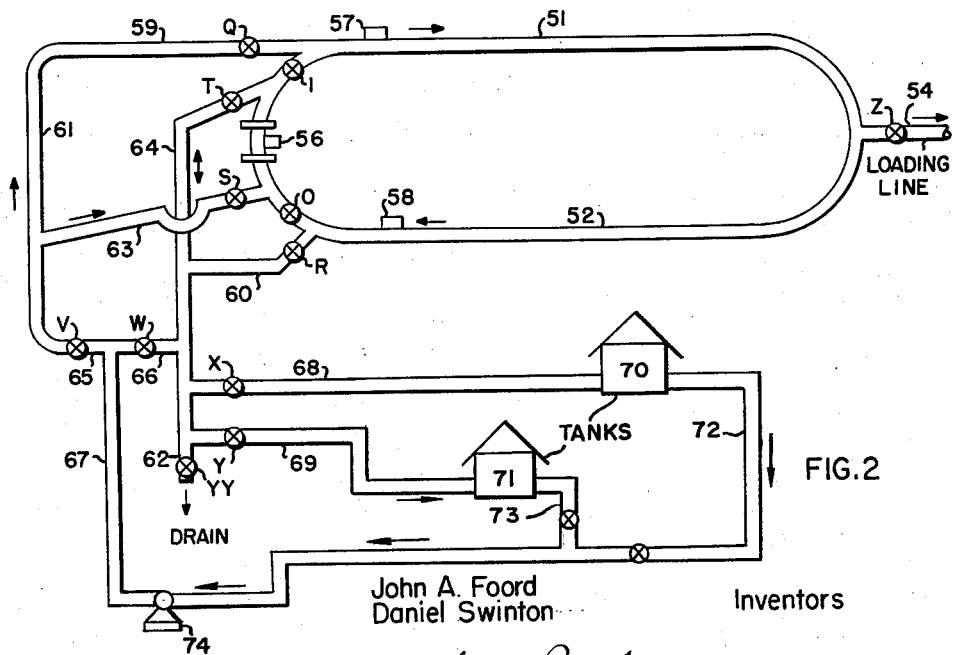

FIGURE 2 shows a schematic layout of apparatus in which the two parallel transport lines are joined at a U bend where delivery is made and with the use of a single pig trap and arrangement at the supply ends of the transport lines for making the pig travel in one direction only, if desired, in making the looped circuit during the displacement operation.

Referring to FIG. 1, the two parallel transport lines of the U circuit are 1 and 2 which meet at the common terminal 3 having the shape of a U bend into which is connected a loading or receiving line having a valve U. The parallel lines 1 and 2 each have at their other ends pig traps 6 and 7. The pig trap is a chamber made to receive the pig and launch the pig through the U circuit. The U bend 3 has a sufficient curvature to permit the pig to move through the curved pipeline without too much resistance in being displaced from the end of one transport line to the end of the other transport line.

Each pig trap 6 and 7 has a connection by a line 8 and 9, respectively, to the dual manifold lines 11 and 12. Each of the connecting lines 8 and 9 has a valve H and G. Each pig trap has a bypass 13 and 14 with valves A and B in the bypass. The valves H and G are inside the bypass circuit.

The manifold lines 11 and 12 are relatively short and are preferably vertical or sloped to permit draining by gravity. Each of the manifold lines has a connecting line 19 and 20 to a supply line 21 from a pump 22. In each of these connecting lines 19 and 20, there is a valve C and D.

Each manifold line 11 and 12 has connecting lines 23 and 24, 25 and 26, to lines 38 and 39 which return displaced products to their respective storage tanks 30 and 31. In the connecting lines 23, 24, 25 and 26 are valves J, K, L and M.

At the lower ends of the manifold lines are valves N and P which are opened for draining these lines into receptacles or pipes 33 and 34.

In using a single supply pump 22, its inlet or suction sideline 35 has manifold connecting lines 36 and 37 to each of the storage tanks 30 and 31, and said connecting lines have valves E and F.

It can be seen that many other product supply sources or storage tanks can be connected into the system in a similar manner. Thus, the U circuit system described, in general, comprises:

(a) A main elongated transport line in the form of a U circuit having two parallel lines extending to their junction at the U bend;

(b) A valved receiving or loading line connected into the U bend;

(c) A pig trap with a valved bypass at each supply end of the parallel transport lines;

(d) A pair of cross-manifold lines with valved connections to the pig trap and to their bypasses;

(e) A valved line from each of the cross-manifold lines to a pump supplying a stream of fluid or liquid product from its source;

(f) A valved line from each of said cross-manifold lines to the source of each product for return of each product to its source when displaced from the U circuit;

(g) A valved connection from each product source to a pump;

(h) A valved drain for each of the cross-manifold lines to be used for draining if contamination is critical.

An example of how the U circuit system shown in the drawing is operated is as follows:

*Example 1*

A liquid product is pumped to the loading outlet 4 from a tank 30 by having valves U, A, B, C, D and E open, while the other valves are closed and pump 22 is running. At this startup, the pig is in either trap 6 or 7 undisturbed. Either of the connecting lines 8 and 9 may be used with its valve opened in place of or with the bypass if the pig is in the other trap. When the loading valve U has been shut off upon filling of a receiving container or ship tank and it is desired to change to delivery of another product, e.g. liquid from tank 31, valves E, A and B are closed and valves F, D, G, H and J are opened, considering that the pig is in the trap 7. The pig is forced from trap 7 in to travel as an interface separator through line 2 of the U circuit with liquid behind it from tank 31 and pushing the other liquid ahead of it through the circuit back to its source, tank 30, via lines 11, 23 and 28 with valve J open in line 23. When the pig has traveled through the U circuit and reaches trap 6, valves H and J are closed and valves A, B and C are opened. Then with the opening of valve U, for loading of the second product and the pump running, the liquid product from tank 31 is transported through both of the parallel transport lines 1 and 2 to the outlet 4.

When it is desired to load with another liquid product from a third storage tank, a similar procedure is used to pass the third liquid product into the pig trap 6 for launching the pig which displaces the second product from the U circuit back to its storage tank 31, filling the U circuit with the third liquid while the second liquid is returned to its storage tank 31, then pumping the third liquid through the parallel transport lines 1 and 2 when the loading valve U is open.

The main transport lines 1 and 2 may be pipelines of 10″ diameter, for example, to deliver at the same rate as a single 14″ diameter pipeline. These transport lines often have to extend for distances such as one mile and even be laid under water to a ship loading position. The loading line 4 connected into the U bend may be of a flexible type.

In FIG. 2 the U circuit is present as in FIG. 1 with parallel lines 51 and 52 which lead to the U bend 53 into which is connected the loading line 54 having a valve Z.

The opposite ends of the parallel transport lines 51 and 52 are also joined in a loop so as to permit the pig to travel through the double loop system without reversing direction. In this modification, what corresponds to a single trap may be in the loop at the charging ends of the transport lines 51 and 52 or close thereby, this trap chamber with signal indicated at 56 being a section of pipeline between two valves I and O. In the loop circuit close to the pig trap zone 56 is located signal means 57 and 58 for automatic control. Such signal means are commercially available indicators which signal when the pig passes through the pipeline where the signal means is located. The signalling may be caused by the pressure of the pig against a lever or trigger. This double loop circuit of the transport lines 51 and 52 is connected by lines 59 and 60 to manifold lines 61 and 62. In each of said connecting lines 59 and 60 is a valve Q and R. Between each of said connecting lines and the pig trap zone 56 is a bypass line 63 and 64, each having a valve S and T. The bypass line 63 is connected into the manifold line 61 and the short bypass line 64 is connected into the manifold line 62. Each of the manifold lines 61 and 62 has a connection 65 and 66 to a supply line 67 from a supply pump which receives a liquid product from a storage tank and which may receive the products from several storage tanks if a single pump rather than a number of supply pumps is to be used. Each of the connecting lines 65 and 66 has a valve V and W. Manifold line 62 is connected by any number of product return lines 68 and 69 to storage tanks for each of the products which is to be returned from the circuit when displaced therefrom. Each of the return lines 68 and 69 has a valve X and Y. The manifold line 62 is preferably vertical or slanted for gravity drainage with valve YY open.

*Example 2*

In the operation of the looped system shown in FIG. 2, a liquid product enters the system from storage through line 67 and with adjustment of the various valves, flows in streams to delivery through both parallel lines 51 and 52 when valve Z in the loading line 54 is open. When a second product is to be loaded, valve Z is closed, as well as valves W and Q, while valves V, S and I are opened, so that the second liquid enters the loop circuit to push the pig from its receiving and launching zone 56 in the direction shown by the arrow toward the signal device 57. The second product is thus pumped behind the pig which is moved through the transport line 51, around the terminal loop and back through the transport line 52, making the product which was previously loaded flow back through line 52 into the manifold line 62. The product being displaced from the system is made to flow back to tankage with valve O closed, valve R opened, and valve X opened. When the signal device 57 is passed by the pig, valves T and I are closed and valve Q is opened to permit unobstructed flow of the second product which is displacing the first product ahead of the moving pig. When the pig passes the signal device 58 in moving toward the pig trap or receiver 56, pumping of the second product is shut off automatically and valve R is closed while valves O and T are opened so that the residual first product is displaced through line 64 into manifold line 62, thence through the storage return line 68 with valve X opened. When a signal in the pig trap 56 indicates that the pig has reached that zone, valves I, T and S are closed, valves Q, R, V, W and Z are opened, and the second product flows through both parallel transport lines 51 and 52 to the terminal U bend 53 into the loading line 54.

If the pig is to be inspected or replaced, the part of the line between valves I and O can be removed from the assembly and then be returned to position.

As can be seen, the operation and means of the FIG. 2 system have similarities to those of the FIG. 1 system. Both systems have a U circuit of parallel transport lines to a loading line at the U bend outlet, with the pig stationed at the other end of the circuit. Both have a manifold supply line and manifold line for returning products displaced from the U circuit. Both have bypass lines around pig traps or zones where the pig is held after displacement.

In FIG. 2, storage tank 70 is a supply source of a first liquid, tank 71 of a second liquid, and each tank drawing a valved supply line 72 and 73 to a supply pump 74.

The systems shown in FIG. 1 and FIG. 2 are useful in a similar manner for loading consecutively fluid products from separate supply sources into separate fixed volume containers at suitable rates through two lines with control of delivery at the loading position. They are designed for displacement of the products from the transport circuit back to their respective supply sources with a minimum of contamination of one product by another. They are adapted for use with a minimum amount of equipment and power.

The invention is claimed as follows:

1. The method of delivering a number of different liquid products from their supply sources to loading zones, which comprises: (a) flowing parallel streams of a liquid product from a supply source in a looped circuit to an outlet at which the parallel streams are joined until the outlet is shut off, (b) forcing another liquid product with interface separation from the first-mentioned liquid into an inlet of said circuit so that said first mentioned liquid previously filling the circuit is displaced back to the source of said liquid while thus filling the looped circuit with the second-mentioned liquid, and (c) passing the second-mentioned liquid in parallel streams through the looped circuit from its supply source through the open outlet at the loop into a loading zone.

2. The method of delivering a number of different liquids consecutively from their supply sources to a loading zone which comprises: (a) flowing a liquid from its supply source in parallel streams through an elongated pair of parallel transport lines from their supply inlets to a common outlet at a U bend terminal forming a looped circuit with said lines until said outlet is shut off, said parallel streams being discharged through said outlet when it is open at the loading zone; (b) flowing a second liquid from its supply source through the supply inlet of one of said parallel lines with interface separation from the first mentioned liquid so that the first-mentioned liquid is displaced through the looped circuit and out at the supply end of the other parallel line back to the supply source of the first-mentioned liquid as the looped circuit having said outlet shut off is filled with the second liquid; (c) with said outlet at the U bend open, passing the second liquid in parallel streams from the inlets of both lines so that said parallel streams of the second liquid are discharged through the common outlet until it is closed; and (d) displacing the second liquid from the looped circuit with its outlet at the U bend closed by a third liquid with interface separation from the second liquid so that the second liquid flows through the looped circuit in a direction reverse to its flow when the second liquid displaced the first-mentioned liquid from the looped circuit.

3. A pipeline system for transporting a number of different fluids consecutively from their supply sources to a discharge line for loading separate containers which comprises: (a) a main elongated transport line in the form of a looped circuit having two parallel lines extending from their supply inlet ends to their junction at a U bend, making the looped circuit; (b) a valved loading line connected into the U bend for discharging fluid streams from both parallel lines into a container; (c) a pig trap with a valved by-pass at the supply inlet end of each of said parallel lines, a pig being in one of the pig traps when both parallel lines are discharging a first fluid into the loading line; (d) a pair of cross-manifold lines with valved connections to each of said pig traps and to their by-passes for supplying fluid through and around the pig traps to the supply inlet ends of the parallel lines; (e) a valved line from each of the cross-manifold lines to a supply pump supplying a stream of fluid from its source, each of at least two supply sources each having a valved connection to the pump; and (f) a valved line from each of said cross-manifold lines to the supply source of each fluid for return of each fluid to its source when displaced from the looped circuit when another fluid is being supplied to a supply inlet end of the looped circuit so as to force the pig and push the first-mentioned fluid ahead of the pig around the looped circuit to its other pig trap end.

4. A pipeline system for transporting a number of different liquid products consecutively from their supply sources to a loading line for loading separate containers, which comprises: (a) an elongated pair of parallel transport lines which join and have an outlet in a U bend terminal; (b) a valved loading line connected to the U bend for loading a container with liquid passed through the transport lines from their supply ends to their outlet in the U bend terminal; (c) a loop pipe section having a valved connection to the supply end of each of the transport lines, said loop section having a pig trap zone for receiving a pig from one of said transport lines, then holding the pig when the valved connections of the loop section to the transport lines are closed; (d) a manifold line having a valved connection to the supply end of one transport line for supplying liquid thereto and bypassing the loop section when the valves of the loop section are closed and having a valved connection into the loop section for supplying liquid thereto for pushing the pig downstream when the valve of the loop section downstream is open; (e) a second manifold line having a valved connection to the supply end of the other transport line for supplying liquid thereto and bypassing the loop section when the valves of the loop section are closed; (f) a valved pipe connection from the second manifold line into the loop section for draining liquid therefrom when the pig is being pushed into the loop section having its upstream valve open and its downstream valve closed; (g) a valved connection from each of the manifold lines to a supply pump line and supply pump which supplies a stream of liquid from its source; (h) a valved line from the second manifold line to each source of a different liquid product for returning each product to its source when displaced from the transport lines and from the loop section; and (i) a valved connection from each different liquid product source to the supply pump.

5. In a pipeline system as described in claim 4, a pig signal device at the supply ends of each of the parallel transport lines for indicating when a pig is approaching the pig trap in the loop section and leaving the pig trap in the loop section.

References Cited in the file of this patent
UNITED STATES PATENTS

| | | |
|---|---|---|
| 2,796,878 | Atkinson | June 25, 1957 |
| 2,948,144 | Applequist | Aug. 9, 1960 |
| 3,001,543 | Barton | Sept. 26, 1961 |